United States Patent
Islam et al.

(10) Patent No.: US 12,105,524 B2
(45) Date of Patent: Oct. 1, 2024

(54) METHOD FOR CONTROLLING VEHICLES REPEATING A CYCLE

(71) Applicant: VOLVO TRUCK CORPORATION, Gothenburg (SE)

(72) Inventors: Mohammad Manjurul Islam, Gothenburg (SE); Jonas Hellgren, Gothenburg (SE)

(73) Assignee: VOLVO TRUCK CORPORATION, Gothenburg (SE)

( * ) Notice: Subject to any disclaimer, the term of this patent is extended or adjusted under 35 U.S.C. 154(b) by 146 days.

(21) Appl. No.: 17/593,567

(22) PCT Filed: Mar. 19, 2020

(86) PCT No.: PCT/EP2020/057696
§ 371 (c)(1),
(2) Date: Sep. 21, 2021

(87) PCT Pub. No.: WO2020/193379
PCT Pub. Date: Oct. 1, 2020

(65) Prior Publication Data
US 2022/0179434 A1 Jun. 9, 2022

(30) Foreign Application Priority Data
Jun. 18, 2019 (SE) .................................... 1950748-2

(51) Int. Cl.
*G05D 1/00* (2024.01)
(52) U.S. Cl.
CPC ......... *G05D 1/0291* (2013.01); *G05D 1/0217* (2013.01); *G05D 1/0223* (2013.01)
(58) Field of Classification Search
CPC .. G05D 1/0291; G05D 1/0217; G05D 1/0223; G05D 2201/021; G05D 1/0289;
(Continued)

(56) References Cited

U.S. PATENT DOCUMENTS

2012/0070804 A1 3/2012 Pang et al.
2013/0297175 A1* 11/2013 Davidson ............... G08G 1/202
  701/99

(Continued)

FOREIGN PATENT DOCUMENTS

DE  102012107284 A1  2/2014
JP     2016045585 A   4/2016
WO    2011055823 A1   5/2011

OTHER PUBLICATIONS

"P. Saayman et al., Optimization of an autonomous vehicle dispatch system in an underground mine, 2006, Southern African Institute of Mining and Metallurgy, pp. 77-86" (Year: 2006).*

(Continued)

Primary Examiner — Vivek D Koppikar
Assistant Examiner — Dominick Mulder
(74) Attorney, Agent, or Firm — Venable LLP; Jeffri A. Kaminski

(57) ABSTRACT

The invention provides a method for controlling a plurality of vehicles which are repeating a cycle of driving along a route, which has at least one single vehicle area (SLTA1, . . . , SLTAm, SP, TP), characterized by—determining speed profiles for the vehicles,—creating a set of different activation times (t11, t21, tr11, tr21) for the vehicles, from an activation position (SP, TP) of the cycle,—simulating vehicle movements through the cycle, with the speed profiles, and the created set of activation times (t11, t21, tr11, tr21),—repeating, a plurality of times, the steps of creating a set of activation times, and simulating vehicle movements, wherein the created set of activation times are different from one repetition to another,—selecting, for controlling the vehicles, from the sets of activation times created by the repetition of the step of creating a set of activation times, a set of activation times (t12, t22, tr12, tr22) for which the simulation shows that there is a minimum time overlap (Continued)

(to21) of vehicles at any of the at least one single vehicle area, and—controlling the vehicles according to the speed profiles and the selected set of activation times.

25 Claims, 6 Drawing Sheets

(58) Field of Classification Search
CPC .. G08G 1/0112; G08G 1/0129; G08G 1/0145; G08G 1/127; B60W 2520/06; B60W 2720/103; B60W 30/165
USPC .......................................................... 701/50
See application file for complete search history.

(56) References Cited

U.S. PATENT DOCUMENTS

| | | | |
|---|---|---|---|
| 2014/0180501 A1 | 6/2014 | Kyllmann | |
| 2014/0297182 A1 | 10/2014 | Casson et al. | |
| 2015/0206433 A1* | 7/2015 | Kanai | G08G 1/165 701/1 |
| 2016/0239023 A1 | 8/2016 | Rylander | |
| 2017/0300049 A1* | 10/2017 | Seally | H04W 4/024 |
| 2018/0336781 A1* | 11/2018 | Jin | G06V 20/41 |
| 2019/0272752 A1* | 9/2019 | Alesiani | G08G 1/0129 |
| 2020/0025583 A1* | 1/2020 | Herlocker | G08G 1/0133 |
| 2020/0139954 A1* | 5/2020 | Wallstedt | B60W 10/18 |
| 2020/0410852 A1* | 12/2020 | Lee | B60W 30/14 |
| 2022/0179434 A1 | 6/2022 | Islam et al. | |

OTHER PUBLICATIONS

Grzegorz Bocewicz et al.: "Using simulation tool for veryfying AGVS modeling and cyclic scheduling", Jul. 7, 2013, pp. 1-8, XP058036722.

International Search Report and Written Opinion dated Jul. 23, 2020 in corresponding International PCT Application No. PCT/EP2020/057696, 9 pages.

International Preliminary Report on Patentability dated Oct. 20, 2020 in corresponding International PCT Application No. PCT/EP2020/057696, 13 pages.

Saayman, Paul. (2006). Optimization of an autonomous vehicle dispatch system in an underground mine. Southern African Institute of Mining and Metallurgy. 10 pages.

Chinese Office Action dated Nov. 29, 2023 in corresponding Chinese Patent Application No. 202080022431.1, 11 pages.

Japanese Office Action dated Feb. 9, 2024 in corresponding Japanese Patent Application No. 2021556657, 4 pages.

China National Intellectual Property Administration Notification on Grant of Patent Right dated Apr. 8, 2024 in corresponding Chinese Patent Application No. 202080022431.1.

* cited by examiner

METHOD FOR CONTROLLING VEHICLES REPEATING A CYCLE

CROSS-REFERENCE TO RELATED APPLICATIONS

This application is a U.S. National Stage application of PCT/EP2020/057696, filed Mar. 19, 2020, and published on Oct. 1, 2020, as WO 2020/193379 A1, which claims priority to Sweden Patent Application No. 1950748-2, filed Jun. 18, 2019, International Application No. PCT/EP2019/057319, filed Mar. 22, 2019 and published on Oct. 1, 2020 as WO 2020/192905 A1, all of which is hereby incorporated by reference in its entirety.

TECHNICAL FIELD

The invention relates to a method for controlling a plurality of vehicles which are repeating a cycle of driving along a route. The invention also relates to a computer program, a computer readable medium, and a control unit.

The invention can be applied in heavy-duty vehicles, such as mining trucks, road trucks and buses. Although the invention will be described with respect to mining trucks, the invention is not restricted to such particular vehicles, but may also be used in other vehicles such as cars.

BACKGROUND

A vehicle operational area, such as a mine, a construction site, or a production site, may include one or more areas where only one vehicle may be present at any point in time. For example, the operational area may include one or more roads with a combination of single-lane and multi-lane traffic areas. In the single-lane traffic areas, vehicles cannot meet from opposite directions. Meeting of two vehicles in opposite directions may be allowed only in the multi-lane traffic areas. The restriction of the single lane traffic areas may result in vehicles having to wait just before entering those areas, and this decreases productivity. Areas where only one vehicle may be present at any point in time, may also be formed by loading, unloading, fueling, or charging areas. Existing solutions involve manual scheduling to address this issue, but thereby optimal planning is not obtained.

US2014297182 discloses a method of navigating a vehicle through a mining environment to a target destination. The method includes determining a first speed profile for the route, identifying a potential contention condition associated with the route, determining a second speed profile, and determining an optimized speed profile using the first and second speed profiles.

However, there is a desire to increase productivity, by providing a more effective way of scheduling the vehicles to avoid waiting times, when a plurality of vehicles are repeating a cycle of driving along a route.

SUMMARY

An object of the invention is to increase the productivity of a plurality of vehicles repeating a cycle of driving along a route. Another object of the invention is to increase the efficiency of vehicle schedules, for avoiding waiting times, when a plurality of vehicles are repeating a cycle of driving along a route.

The objects are reached with a method for controlling a plurality of vehicles which are repeating a cycle of driving along a route, which has at least one single vehicle area. The method comprises:
  determining speed profiles for the vehicles,
  creating a set of different activation times for the vehicles, from an activation position of the cycle,
  simulating vehicle movements through the cycle, with the speed profiles, and the created set of activation times,
  repeating, a plurality of times, the steps of creating a set of activation times, and simulating vehicle movements, wherein the created set of activation times are different from one repetition to another,
  selecting, for controlling the vehicles, from the sets of activation times created by the repetition of the step of creating a set of activation times, a set of activation times for which the simulation shows that there is a minimum time overlap of vehicles at any of the at least one single vehicle area, and
  controlling the vehicles according to the speed profiles and the selected set of activation times.

The cycle may form a part of a mission. A mission may comprise one or more cycles.

An activation time may be a time of activation of a cycle, or a mission. In some embodiments, the activation time is a starting time. For such embodiments, the activation position may be a starting position. The starting time may be a point in time when a cycle starts. A cycle might start, at the starting time, with the vehicle departing from the starting position. In some embodiments, the cycle might start, at the starting time, with the vehicle engaging in an activity at the starting position, such as loading or unloading.

In some embodiments, the activation time is a resumption time. For such embodiments, the activation position may be a resumption position. The resumption time may be a point in time when an interrupted mission of a vehicle is resumed. A time interval from a point in time when a vehicle discontinues a mission, to a point in time when the vehicle resumes the mission, is herein referred to as a waiting duration. A waiting duration may be a time interval during which the vehicle is inactive. A mission may be resumed, at the resumption time, with the vehicle departing from the resumption position. In some embodiments, the mission may be resumed, at the resumption time, with the vehicle engaging in an activity at the resumption position, such as loading or unloading.

In some embodiments, at least a portion of the route is on a road, on which the vehicles move in both directions, and which has at least one portion with a single lane, wherein at least one of the at least one single vehicle area is formed by the at least one single lane road portion. It is understood that the control of the vehicles provides for avoiding collisions between vehicles in the single lane portion. The cycle may be from a route end-position to another route end-position, and back, or a route starting position to a turn-around position and back. The end positions are herein also referred to as activation positions. The road may have a single lane portion, or a plurality of single lane portions. The road may also have one or more multi lane portions, e.g. double lane portions. Preferably the multi-lane portions have a length which is sufficient for two vehicles to meet without slowing down due to the meeting.

Alternatively, or in addition, the at least one single vehicle area may be an activation position, e.g. the starting position, a loading position, a turn-around position, and/or an unloading position. A loading position, and an unloading position, could be provided for loading, and unloading, respectively, material, goods, or people. For example, a single vehicle area may be formed of a bus stop, allowing only one bus at the time to load and/or unload passengers.

The vehicle movement simulation may be in a time domain. The vehicle movement simulation may be done with the speed profile, and the set of activation times created in the step of creating a set of different activation times for the vehicles. At the repetitions, the created set of activation times are different from one repetition to another, preferably each time with a new set of activation times. Preferably, some, or all, of the activation time sets are such that all vehicles have started when the first vehicle completed the first cycle.

Selecting a set of activation times preferably comprises selecting a set of activation times from the sets of activation times created by the repetition of the step of creating a set of activation times.

In some embodiments, there may be a predetermined number of repetitions of the steps of creating a set of activation times, and simulating vehicle movements, and the step of selecting a activation time set may be made after the execution of all predetermined number of repetitions. As explained below, a negative time overlap of vehicles at a single vehicle area means that there is no time overlap at the single vehicle area. In further embodiments, the repetitions may be done until a simulation, showing no time overlap of vehicles at any of the at least one single vehicle area. Thereby the repetitions may be terminated. Alternatively, the repetitions may be continued to further minimize the negative time overlap. Thereby, the time gap between the usage of the single vehicle area by any two consecutive vehicles will increase.

Thus, the invention may involve repeating a simulation of vehicle movements, each time with a new set of selected vehicle activation times, and selecting a set of activation times, for which there is no time overlap of vehicles at any of the single vehicle area. The invention improves the control of a vehicle fleet. The invention provides a way to plan, simultaneously for all vehicles, vehicle movements, without having to adjust the speed of any vehicle, once the vehicles have been activated. The method according to the invention provides a holistic approach to the vehicle scheduling problem, allowing it to be solved for the entire vehicle fleet at once. Also, the invention allows for obtaining an optimized scheduling, even where there is a relatively large number of vehicles. Thus, the invention provides an effective method for scheduling vehicles repeating a cycle of driving along a route. Thereby, unscheduled waiting times may be avoided, and productivity increased.

It should be noted that embodiments of the method may be used to determine the number of vehicles needed to achieve a given productivity. Embodiments of the method may also be used to determine the required time needed to reach a given production.

In some embodiments, the steps of creating a set of different activation times for the vehicles, simulating vehicle movements through the cycle, repeating the steps of creating a set of activation times, and simulating vehicle movements, selecting, for controlling the vehicles, a set of activation times, and controlling the vehicles according to the speed profiles and the selected set of activation times, may be repeated a plurality of times. For example, said steps may be repeated every cycle of the mission. As a further example, said steps may be repeated within time intervals, which may be predetermined.

Preferably, the determined speed profiles are the same for the vehicles. Thus, the determined speed profile may be common for all vehicles. This simplifies the execution of the method. In some embodiments, however, a plurality of speed profiles may be determined, being different for the vehicles. The determined speed profile(s) may be a desired speed profile. The determined speed profile(s) may indicate the vehicle speed as a function of time as the respective vehicle is driving through the cycle.

Preferably, the step of simulating vehicle movements comprises simulating vehicle movements over at least two cycles. Thereby, an accurate scheduling may be secured. In some embodiments, the vehicle movements may be simulated over more than two cycles. However, in further embodiments, the vehicle movements may be simulated over only one cycle.

Preferably, selecting, for controlling the vehicles, a set of activation times comprises determining, from each simulation, the largest time overlap of two vehicles at the same single vehicle area. It should be noted that said largest time overlap may be negative, indicating no time overlap of two vehicles at the same single vehicle area. The method preferably comprises selecting, for controlling the vehicles, the set of activation times of the simulation presenting the lowest of the largest time overlaps. Thereby, an algorithm, which may be implemented with a relatively small use of bandwidth may be provided. Thus, the simulation showing that there is a minimum time overlap of vehicles at any of the at least one single vehicle area, may be the simulation with the lowest of the largest time overlap. The minimum time overlap may be the lowest of the largest time overlap. The minimum time overlap may be the lowest of the largest time overlaps at each single vehicle area. The minimum time overlap may be negative, or positive. A positive value would indicate that more than one vehicle is present at a single vehicle area. In such a case, steps of the method may be carried out again, as suggested below. Preferably, the minimum time overlap shown by the simulation, the set of activation times of which are selected for controlling the vehicles, is negative. Thereby, it is secured that only one vehicle is present at any point in time in any of the single vehicle areas. The simulations may form a vector including multiple largest time overlaps. The creating of a set of activation times, and the repetition thereof, may be part of an optimization in which the largest overlap value in the vector is minimized.

Selecting, for controlling the vehicles, a set of activation times may comprise selecting the set of activation times for which the simulation shows that there is no positive time overlap of vehicles at any of the at least one single vehicle area. Thereby, the computational capacity requirements may be relatively low where the repetition of the activation time set creation, and the vehicle movement simulation, can be terminated as soon as a simulation, showing no positive time overlap of vehicles at any of the at least one single vehicle area, appears. It should be noted however that in some embodiments, a plurality of the simulations may show that there is no positive time overlap of vehicles at any of the at least one single vehicle area. In such cases, the method may involve a selection between the activation time sets of such simulation, according to a suitable criterium, e.g. a random selection.

In case all simulations, for all respective activation time sets, each have at least one positive time overlap of vehicles at any of the at least one single vehicle area, steps of the method may be carried out again. Thereby, the step of determining speed profiles for the vehicles may comprise adjusting the speed profile of at least one of the vehicles. For example, one of the vehicles may be slowed down during at least a portion of the cycle. Alternatively, the speed profile for all vehicles may be adjusted. Thereafter, the repeated steps of creating a set of different activation times, and simulating vehicle movements, may be carried out again with the adjusted speed profile(s).

Selecting, for controlling the vehicles, a set of activation times may comprise, for each simulation, determining the shortest time gap between movements of two vehicles through any one of the at least one single vehicle area. Thereby, the largest time overlap of two vehicles at the same single vehicle area may have the same absolute value as the shortest time gap between movements of two vehicles through any one of the at least one single vehicle area. Thus, the method may comprise selecting, for controlling the vehicles, the set of activation times of the simulation presenting the largest of the shortest time gaps between movements of two vehicles through any one of the at least one single vehicle area.

In some embodiments, the sets of activation times may be created randomly. Thereby, simplified algorithm is provided. In further embodiments however, repeating the step of creating a set of activation times may comprise changing one or more of the activation times by one or more predetermined time intervals. Thereby, the method may comprise creating all possible combinations of activation times, in which one of more of the activation times differ from one set to another by the one or more predetermined time intervals. This may limit the computational requirement for executing the method. The one or more time intervals may be determined in any suitable manner. For example, the one or more time intervals may be an integer of seconds. As a further example, such a predetermined time interval may be obtained by dividing a cycle time, given by a determined speed profile, by an integer.

The method involving the selection of a set of activation times, may be an optimization, done in order to find a set of activation times for which there is no time overlap of vehicles at any of the at least one single vehicle area. In some embodiments, the optimization may be performed after the cycles or missions of the vehicles have started.

In some embodiments, in which the route extends between two end positions, the activation position is one of the end positions. In some embodiments, e.g. where the activation position is one of two end positions of the route, the method may comprise determining estimated times of arrival of the vehicles, at the activation position. Thereby, an activation time may occur after the start of a vehicle mission. Thereby, the sets of different activation times may be created in dependence on the times of arrival. I.e. for a vehicle an activation times may be dependent on the time of arrival of the vehicle at the activation position. In particular, the activation time may not occur before the time of arrival at the activation position.

The estimated times of arrival of the vehicles may be determined at least partly based on the speed profiles. The speed profiles may be predicted speed profiles. The method may comprise determining actual positions of the vehicles. Thereby, the estimated times of arrival of the vehicles may be determined at least partly based on the actual positions. For example, an estimated time of arrival may be determined based on an actual position, and a speed profile between the actual position, and the activation position.

The estimated times of arrival may vary with time. This may be due to diversions of the actual speed profiles, from predicted speed profiles. Therefore, preferably, the estimated times of arrival of the vehicles may be determined repeatedly, or continuously. If the activation position is a loading position, or an unloading position, preferably, the estimated times of arrival of the vehicles is determined before the vehicle arriving first at the activation position, has finished loading, or unloading.

The sets of activation times may be created by creating sets of staying durations at the activation position. The staying durations may extend from the respective times of arrivals, to respective activation times. Thereby, the selected set of activation times may minimize the staying durations. A weighting function may be used to balance the minimization of the staying durations, and the minimization of the time overlap of vehicles at any of the at least one single vehicle area.

Thus, the method may comprise creating a set of different staying durations for the vehicles at the activation position. Vehicle movements may be simulated through the cycle, with the speed profiles, and the created set of staying durations. It should be noted that the cycle may be simulated with the activation time at a point between the beginning and the end of the cycle. Nevertheless, the simulation is preferably done through the entire cycle. The method may further comprise repeating, a plurality of times, the steps of creating a set of staying durations, and simulating vehicle movements, wherein the created set of staying durations are different from one repetition to another. Thereby, a set of staying durations, for controlling the vehicles, may be selected, from the sets of staying durations created by the repetition of the step of creating a set of staying durations, for which the simulation shows that there is a minimum time overlap of vehicles at any of the at least one single vehicle area.

The end positions may be a loading position, and an unloading position, respectively. Thereby, the staying durations may include respective durations for loading, or unloading the vehicles, upon arriving at the one of the one of the end positions, and respective waiting durations of the vehicles. Thereby, the activation times may also be referred to as resumption times. Also, the activation position may also be referred to as a resumption position. Preferably, the staying durations are not shorter that the respective loading or unloading durations. The method including a selection of a set of staying durations at the resumption position, may be carried out after a method including a selection of a set of starting times at a starting position of the cycle, or mission. The method including a selection of a set of staying durations at the resumption position, may be carried out repetitively at each of the end positions, as the vehicles carry out their missions. The method may be repeated until all missions are finalized.

In some embodiments, all vehicles may have the same loading durations, and the same unloading durations. In some embodiments, the loading durations for one or more of the vehicles may differ from the loading durations of one or more of the remaining vehicles. In some embodiments, the unloading durations for one or more of the vehicles may differ from the unloading durations of one or more of the remaining vehicles.

The selected set of activation times may minimize the waiting durations. A waiting duration may be positive. The selected set of activation times may be such that for some vehicles, the waiting duration is zero.

Thus, in some embodiments, after the cycles or missions have started, waiting durations may be allocated, to avoid interference of vehicles in any of the single vehicle areas. The method may thereby minimize the waiting durations, to not reduce the productivity of the vehicles. Such an allocation of waiting durations may be made, e.g. when it is not possible to find a set of activation times at a start of a cycle, or mission, for which there are only negative time overlaps of vehicles at the at least one single vehicle area. This may occur, e.g. where there are a relatively large number of vehicles, and/or a relatively large number of single vehicle areas The determination of estimated times of arrival of the vehicles, at the activation position, is preferably made before any of the vehicles have arrived at the activation position, during a cycle. Thereby, the vehicle movement simulations may, for one or more of the vehicles, take one or more oncoming vehicles, which have not yet arrived at the activation position, into consideration.

As suggested, the activation time may be a starting time. For such embodiments, the activation position may be a starting position. Furthermore, creating a set of different activation times for the vehicles, from an activation position of the cycle, may comprise creating a set of different starting times for the vehicles, from a starting position of the cycle. Thereby, simulating vehicle movements through the cycle, with the speed profiles, and the created set of activation times, may comprise simulating vehicle movements through the cycle, with the speed profiles, and the created set of starting times.

Further, repeating, a plurality of times, the steps of creating a set of activation times, and simulating vehicle movements, wherein the created set of activation times are different from one repetition to another, may comprise repeating, a plurality of times, the steps of creating a set of starting times, and simulating vehicle movements, wherein the created set of starting times are different from one repetition to another.

Further, selecting, for controlling the vehicles, from the sets of activation times created by the repetition of the step of creating a set of activation times, a set of activation times for which the simulation shows that there is a minimum time overlap of vehicles at any of the at least one single vehicle area, may comprise selecting, for controlling the vehicles, from the sets of starting times created by the repetition of the step of creating a set of starting times, a set of starting times for which the simulation shows that there is a minimum time overlap of vehicles at any of the at least one single vehicle area.

Further, controlling the vehicles according to the speed profiles and the selected set of activation times, may comprise controlling the vehicles according to the speed profiles and the selected set of starting times.

Thus, in some embodiments, the method comprises:
determining speed profiles for the vehicles,
creating a set of different starting times for the vehicles, from a starting position of the cycle,
simulating vehicle movements through the cycle, with the speed profiles, and the created set of starting times,
repeating, a plurality of times, the steps of creating a set of starting times, and simulating vehicle movements, wherein the created set of starting times are different from one repetition to another,
selecting, for controlling the vehicles, from the sets of starting times created by the repetition of the step of creating a set of starting times, a set of starting times for which the simulation shows that there is a minimum time overlap of vehicles at any of the at least one single vehicle area, and
controlling the vehicles according to the speed profiles and the selected set of starting times.

Preferably, selecting, for controlling the vehicles, a set of starting times comprises determining, from each simulation, the largest time overlap of two vehicles at the same single vehicle area. The method preferably comprises selecting, for controlling the vehicles, the set of starting times of the simulation presenting the lowest of the largest time overlaps.

Selecting, for controlling the vehicles, a set of starting times may comprise selecting the set of starting times for which the simulation shows that there is no positive time overlap of vehicles at any of the at least one single vehicle area.

Selecting, for controlling the vehicles, a set of starting times may comprise, for each simulation, determining the shortest time gap between movements of two vehicles through any one of the at least one single vehicle area. Thereby, the method may comprise selecting, for controlling the vehicles, the set of starting times of the simulation presenting the largest of the shortest time gaps between movements of two vehicles through any one of the at least one single vehicle area.

In some embodiments, the sets of starting times may be created randomly. In further embodiments however, repeating the step of creating a set of starting times may comprise changing one or more of the starting times by one or more predetermined time intervals. Thereby, the method may comprise creating all possible combinations of starting times, in which one of more of the starting times differ from one set to another by the one or more predetermined time intervals.

The objects are also reached with a computer program, a computer readable medium, or a control unit or a group of control units. The control unit(s) may be positioned remotely from the vehicles. In some embodiments, the method may be performed by a single control unit in one of the vehicles, and in other embodiments, the method may be performed by a group of control units distributed in the vehicles.

Further advantages and advantageous features of the invention are disclosed in the following description and in the dependent claims.

BRIEF DESCRIPTION OF THE DRAWINGS

With reference to the appended drawings, below follows a more detailed description of embodiments of the invention cited as examples.

In the drawings.

DETAILED DESCRIPTION OF EXAMPLE EMBODIMENTS OF THE INVENTION

Figure 1:
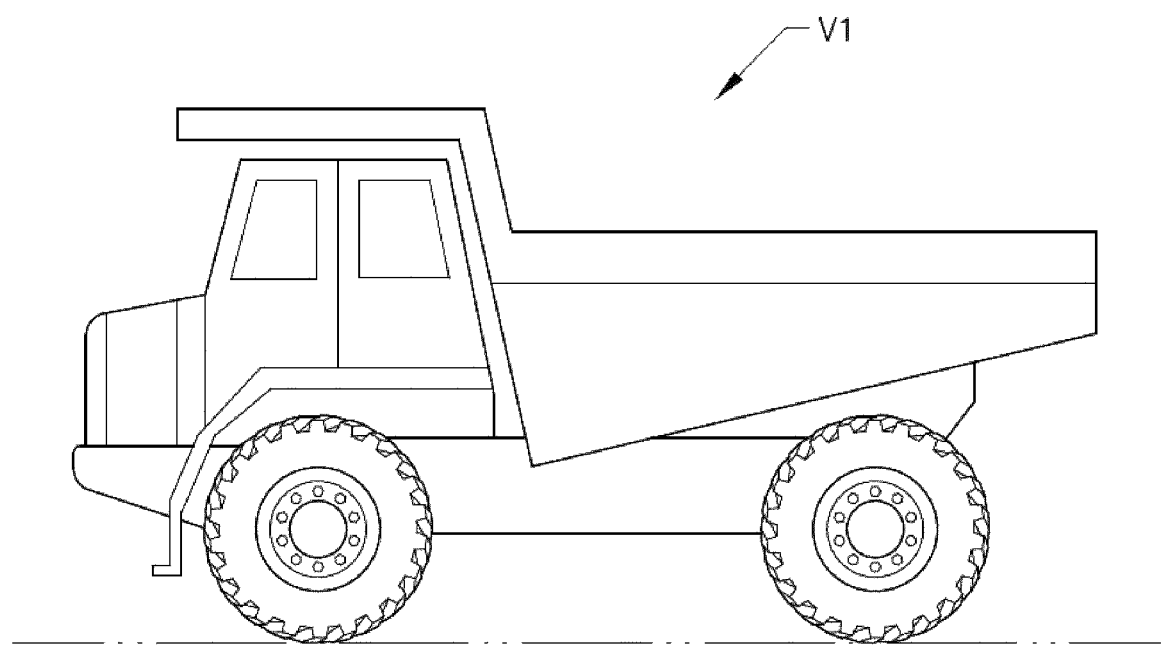
FIG. 1 shows a vehicle in the form of a mining truck.

FIG. 1 depicts a heavy-duty vehicle V1 in the form of a mining truck.

Figure 2:
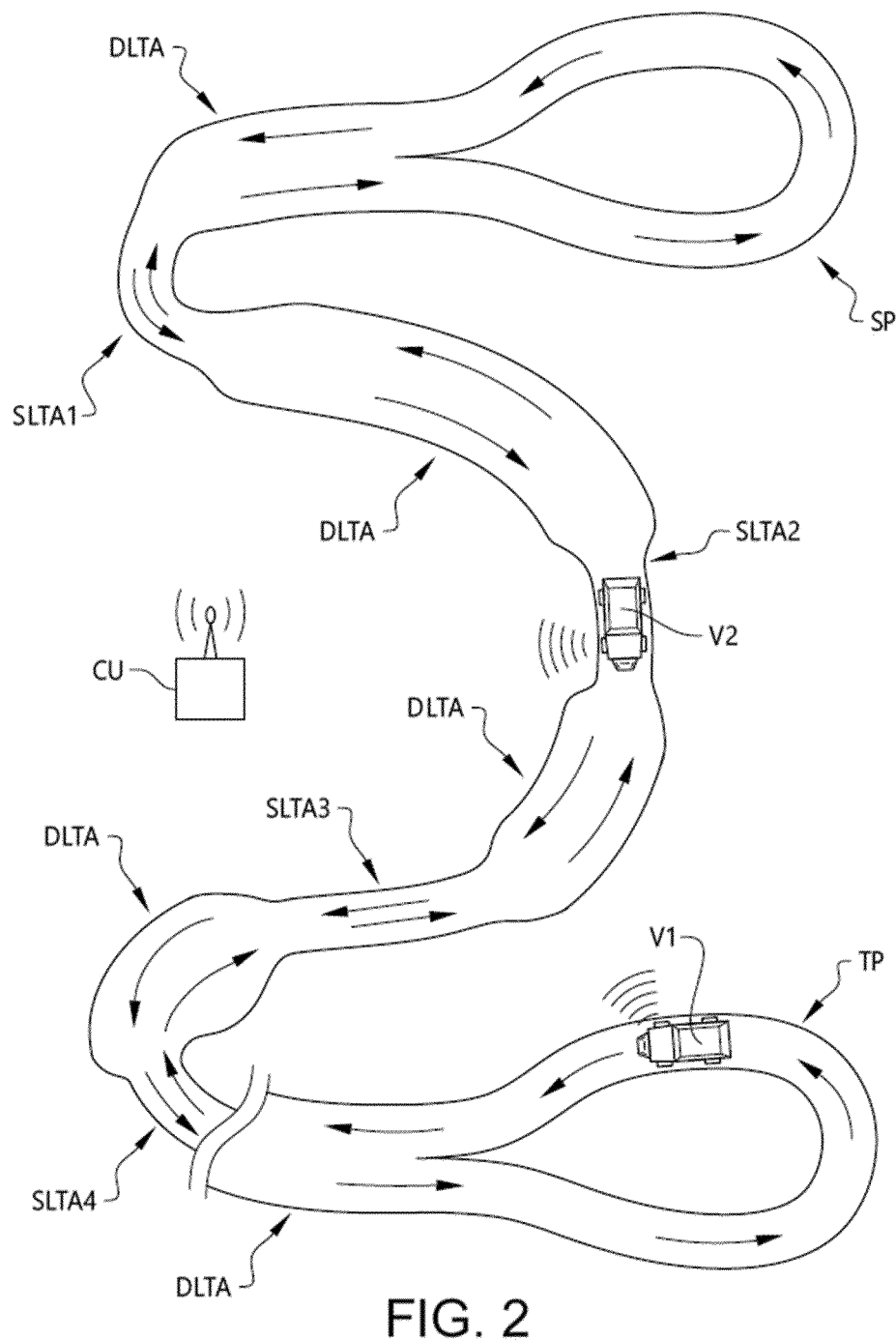
FIG. 2 shows schematically a route travelled by two vehicles during a mission cycle.

FIG. 2 depicts a route, on a road, on which vehicles V1, V2, as the one shown in FIG. 1, perform repeated cycles in a mission. The environment is in this example a mine, but the route could be in any type of environment, such as in a construction site, along an urban road, and/or along a rural road. Also, the invention is applicable to a variety of vehicle mission types. Further, the vehicles may be of any type suitable for the particular mission. For example, the vehicles may be road trucks, delivery vans, buses, or cars. The vehicles are referred to as a first vehicle V1, and a second vehicle V2. The group of vehicles V1-V2 are herein also referred to as a fleet of vehicles. It should be noted that embodiments of the invention is applicable to vehicle fleets with any number of vehicles.

The cycle involves driving on the road, from an activation position, in the form of a starting position SP, to a turn-around position TP, and back along the same road to the starting position. Thus, the vehicles move in both directions along the road. Thus, the mission could be referred to as a circulating mission.

In this example, the cycle involves loading at the starting position SP, and unloading at the turn-around position TP. In this example, only one vehicle at the time can load at the starting position SP, which therefore forms what is herein referred to as a single vehicle area. In this example, only one vehicle at the time can unload at the turn-around position TP, which therefore forms a single vehicle area.

In general, the route could include any number of positions for respective specified activities. The activities could be of any suitable alternative type, for example delivery or pick-up of goods or people, or fuelling and/or charging of batteries of the vehicles. Any of such positions may be arranged so that only one vehicle at the time can be present to perform the respective activity, and therefore form single vehicle areas.

The road has, between the starting position and the turn-around position TP, a plurality of portions SLTA1, . . . , SLTAm with a single lane, herein also referred to as single-lane traffic areas. Between the single lane portions, the road presents double lane portions DLTA, herein also referred to as double lane traffic areas. In the single lane portions, there is only one lane, and hence vehicles driving in opposite directions cannot meet in the single lane portions. The single lane portions therefore form single vehicle areas. In the double portions there are two lanes, making it possible for vehicles driving in opposite directions to meet. It is of course possible that some portions have more than two lanes. Herein, areas with more than one lane, including double lane traffic areas, are also referred to as multi-lane traffic areas, or multi lane portions.

A control unit CU is arranged to carry out steps of an embodiment of a method according to the invention. The control unit could be a part of a control center for controlling the vehicles V1-V2. The control unit CU is arranged to communicate wirelessly with each of the vehicles V1-V2.

The control unit CU may be arranged to receive information from the vehicles, e.g. regarding their positions, and speeds. The control unit may also be arranged to send control commands to the vehicles. In some embodiments, the vehicles are driverless, and control devices (not shown) in the vehicles, which are arranged to control operational devices of the vehicles, such as engines, motors, brakes and steering, may be arranged to read the control commands from the control unit CU. In other embodiments, the vehicles may be arranged to display control commands from the control unit CU, to drivers of the vehicles.

In some embodiments, the control unit CU could be located on one of the vehicles, or parts of the control unit CU could be distributed on a plurality of the vehicles.

It is understood that the control unit CU comprise a computer. It is further understood that the control unit CU may be arranged to carry out an embodiment of the method according to the invention, by means of a computer program.

Figure 3:
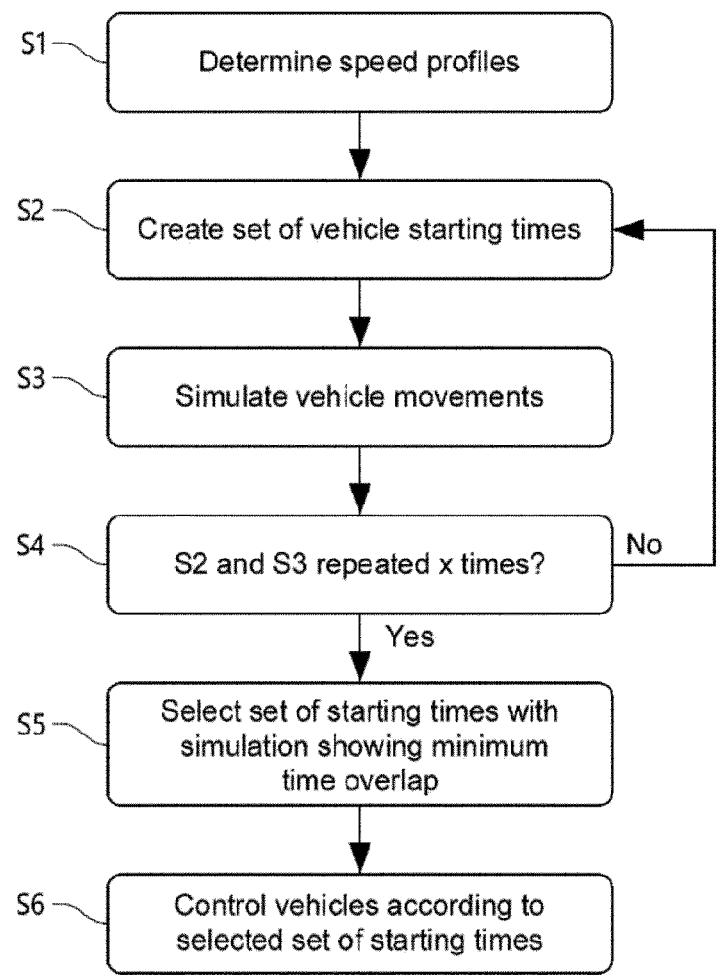
FIG. 3 is a diagram depicting steps in a method according to an embodiment of the invention.

With reference to FIG. 3, said embodiment of the method of controlling the vehicles will be described. The method is aimed at avoiding vehicle meetings in any of the single lane portions SLTA1, . . . , SLTAm, (FIG. 2). The method is also aimed at avoiding a vehicle waiting for another vehicle at any of the starting position SP and the turn-around position TP. The single lane portions SLTA1, . . . , SLTAm, the starting position SP, and the turn-around position TP each form a respective of what is herein referred to as a single vehicle area.

The method is preferably initiated before any of the vehicles have started their respective cycles.

The method comprises determining S1 speed profiles for the vehicles. The speed profiles include target speeds of the vehicles at positions along the route. In this example, the determined speed profiles are the same for the vehicles.

Figure 4:
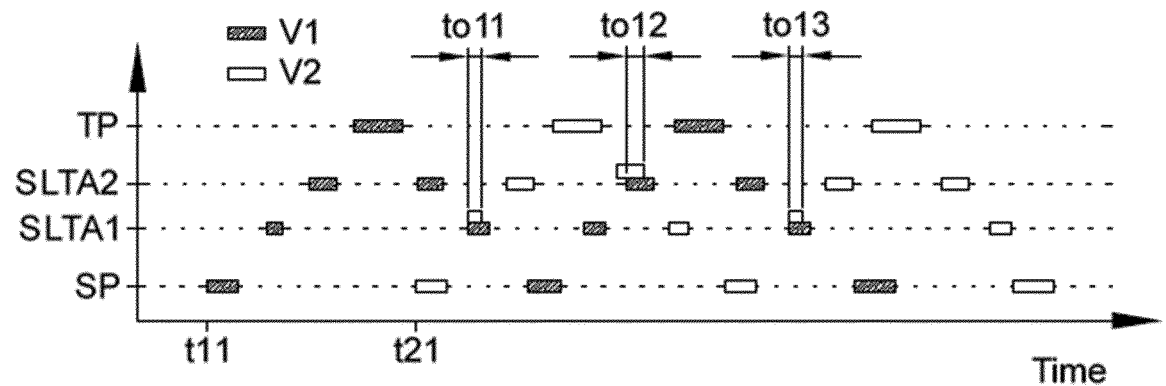
FIG. 4, FIG. 5, FIG. 7, and FIG. 8 are diagrams depicting time intervals during which the vehicles in FIG. 2 are in certain portions of the route in FIG. 2.

Reference is made also to FIG. 4, showing a diagram depicting the time intervals during which the vehicles V1, V2 are in the starting position SP, a first of the single lane portions, SLTA1, a second of the single lane portions SLTA2, and in the turn-around position TP. For simplicity of this presentation, only two of the single lane areas are represented in FIG. 4. It should be noted that the time intervals during which the vehicles are at the single vehicle areas may include one or more margins allowing the vehicles to enter and leave the area.

The method further comprises creating S2 a set of different starting times t11, t21 for the vehicles, from the starting position SP of the cycle.

Thereafter, vehicle movements through the cycle are simulated S3, with the speed profiles, and the created set of starting times t11, t21. Thereby, the vehicle movements are simulated over two cycles. The result is shown in FIG. 4.

Figure 5:
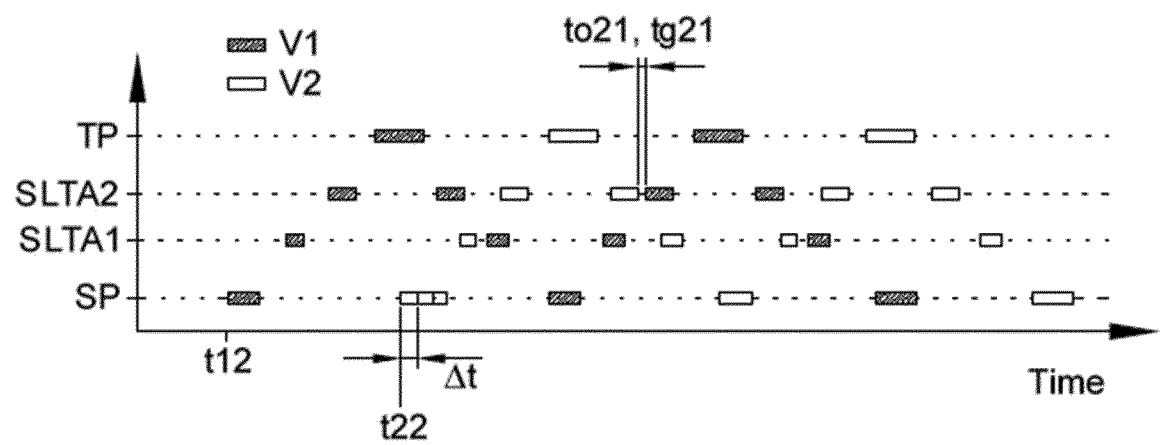

Reference is made also to FIG. 5. The steps of creating S2 a set of starting times, and simulating S3 vehicle movements, are repeated S4, a predetermined number x of times. At each repetition, the created set of starting times are different from any of the starting time sets previously created. For simplicity of this presentation, only one repetition is depicted, through FIG. 5.

In some embodiments, the sets of starting times are created S2 randomly. In other embodiments, repeating the step of creating a set of starting times comprises changing one or more of the starting times by one or more predetermined time intervals $\Delta t$, as exemplified in FIG. 5. Such embodiments may include creating all possible combinations of starting times, in which one of more of the starting times differ from one set to another by the one or more predetermined time intervals $\Delta t$.

In the example in FIG. 4 and FIG. 5, the starting time t11 for the first vehicle V1 in the first set of starting times t11, t21, shown in FIG. 4, is the same as the starting time t12 for the first vehicle V1 in the second set of starting times t12, t22, shown in FIG. 5. However, the starting time t22 for the second vehicle V2 in the second set of starting times t12, t22, shown in FIG. 5, is changed, more specifically advanced, by a time interval $\Delta t$, compared to the starting time t21 for the second vehicle V2 in the first set of starting times t11, t21, shown in FIG. 4.

When the simulation S3 of the vehicle movements has been repeated S4 the predetermined number x of times, from the sets of starting times created by the repetition, a set of starting times t12, t22 is selected S5, in this example, the starting time set shown in FIG. 5. The starting time set is selected for controlling the vehicles V1, V2. The selected starting time set is the starting time set for which the simulation S3 shows that there is a minimum time overlap to21 of vehicles at any of the single vehicle areas SLTA1, SLTA2, SP, TP.

10 Preferably, the starting time selection S5, for controlling the vehicles, comprises determining, from each simulation, the largest time overlap of two vehicles at the same single vehicle area. In the simulation depicted in FIG. 4, the largest time overlap of the two vehicles at the same single lane road portion, SLTA2, is indicated as to12. In the simulation depicted in FIG. 5, the largest time overlap of the two vehicles at the same single lane road portion, SLTA2, is indicated as to21, which is negative. This indicates that in the simulation of FIG. 5, there is no time overlap of the two vehicles at any of the single vehicle areas SLTA1, SLTA2, SP, TP. The simulation of FIG. 5 hence presents the lowest to21 of the largest time overlaps to12, to21.

The starting time set of FIG. 5 is therefore selected S5 for controlling the vehicles. The method further comprises controlling S6 the vehicles according to the speed profiles and the selected set of starting times.

A further embodiment of the invention will be described with reference to FIG. 6-FIG. 8. Similar to the embodiment described with reference to FIG. 2-FIG. 5, an example of the further embodiment involves a first vehicle V1, and a second vehicle V2, as the one shown in FIG. 1, performing repeated cycles in a mission, along a road of a route. The cycle involves driving on the road, from an activation position, in the form of a starting position SP, to another activation position, in the form of a turn-around position TP, and back along the same road to the starting position. The starting position SP is a loading position, and the turn-around position TP is an unloading position. Further similarities to the embodiment described with reference to FIG. 2-FIG. 5, include that only one vehicle at a time can load at the starting position SP, and only one vehicle at a time can unload at the turn-around position TP. Further, the road has, between the starting position SP and the turn-around position TP, a plurality of single lane portions SLTA1, . . . , SLTAm.

Figure 6:
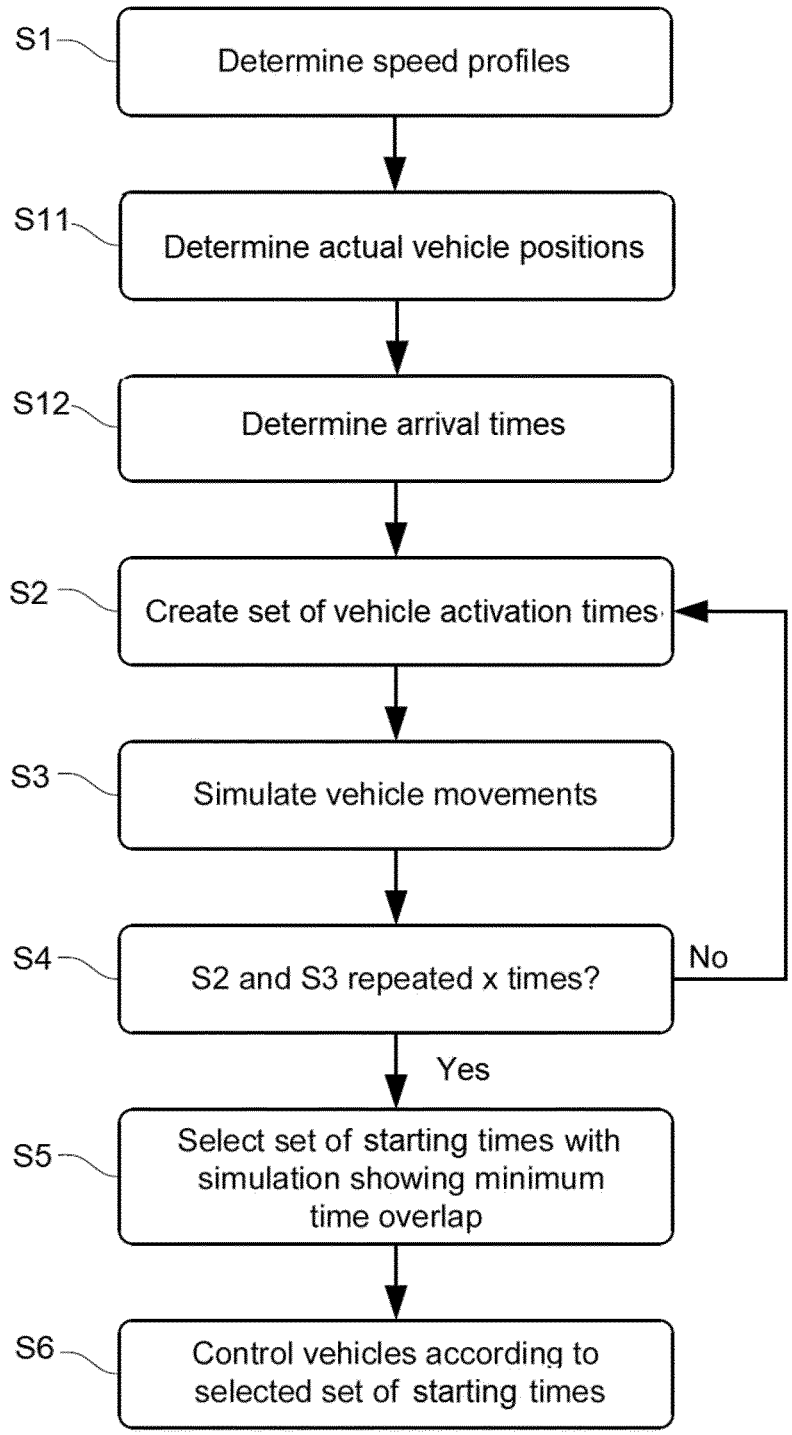
FIG. 6 is a diagram depicting steps in a method according to another embodiment of the invention.
Figure 7:
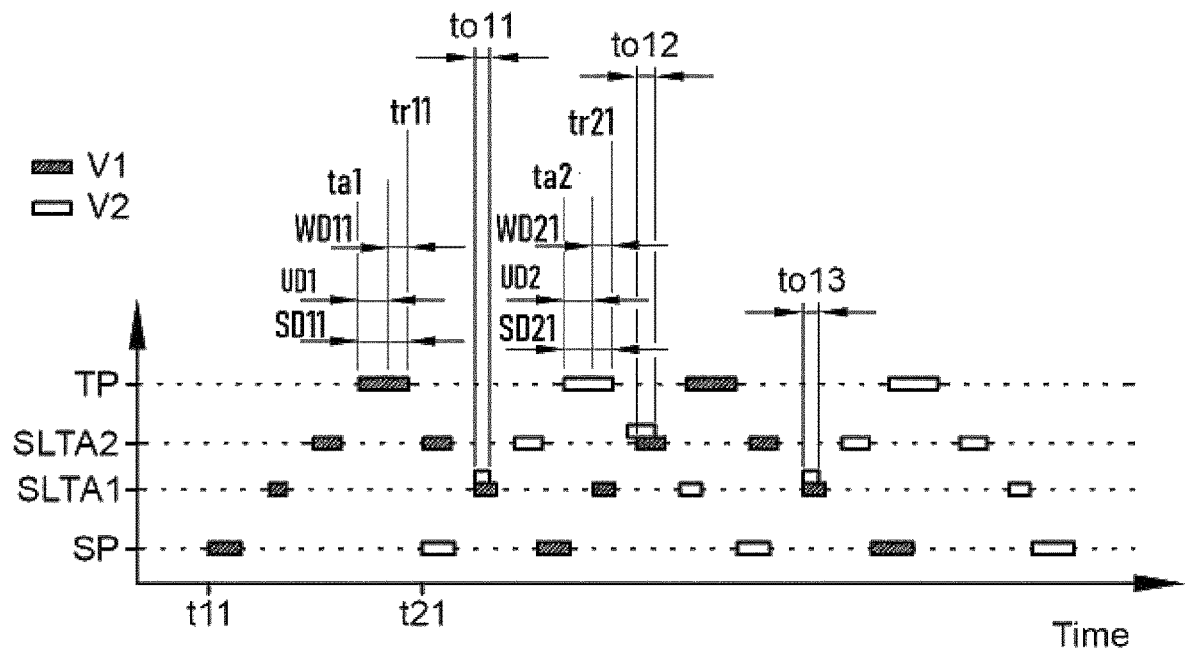
Figure 8:
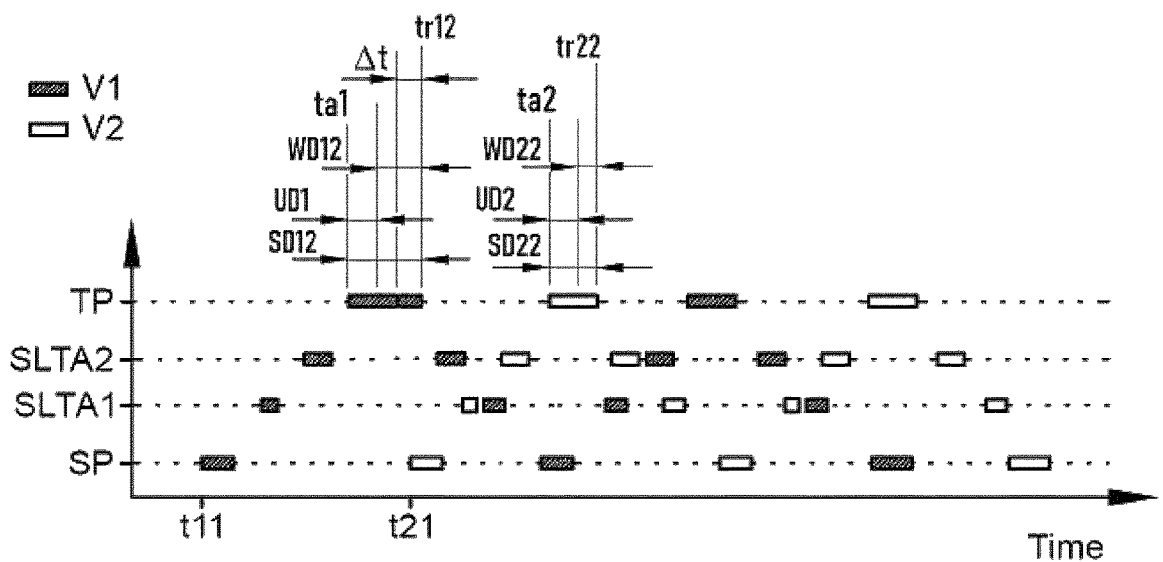

With reference to FIG. 6-FIG. 8, said embodiment of the method of controlling the vehicles will be described. The method comprises determining S1 speed profiles for the vehicles. The method further comprises determining S11 the actual positions of the vehicles. Based on the actual positions and the speed profiles, the estimated times of arrival of the vehicles ta1, ta2, at the turn-around position TP, are determined S12.

The method further comprises creating S2, in dependence on the estimated times of arrival, a set of different activation times tr11, tr21 for the vehicles, from the turn-around position TP. Thereby, sets of staying durations SD11, SD21 at the activation position TP, are created. The staying durations SD11, SD21 include respective durations UD1, UD2 for unloading the vehicles, upon arriving at the turn-around position TP. The staying durations SD11, SD21 further include respective waiting durations WD11, WD21 of the vehicles. More specifically, a staying duration SD11, SD21 is in this example formed by an unloading duration UD1, UD2, and a following waiting duration WD11, WD21. The staying durations SD11, SD21 extend from the respective times of arrivals ta1, ta2, to respective activation times tr11, tr21. The method may also be carried out at the loading position SP. Thereby, a staying duration SD11, SD21 may be formed by a loading duration, and a following waiting duration WD11, WD21.

Thereafter, vehicle movements through the cycle are simulated S3, with the speed profiles, and the created set of activation times tr11, tr21. Thereby, the vehicle movements are simulated over one cycle. In other embodiments, the vehicle movements may be simulated over two or more cycles. The result is shown in FIG. 7.

Reference is made also to FIG. 8. The steps of creating S2 a set of activation times, and simulating S3 vehicle movements, are repeated S4, a predetermined number x of times. At each repetition, the created set of activation times are different from any of the activation time sets previously created. For simplicity of this presentation, only one repetition is depicted, through FIG. 8.

In this embodiment, repeating the step of creating a set of activation times comprises changing one or more of the activation times by one or more predetermined time intervals Δt.

In the example in FIG. 7 and FIG. 8, the activation time tr21 for the second vehicle V2 in the first set of activation times tr11, tr21, shown in FIG. 7, is the same as the activation time tr22 for the second vehicle V2 in the second set of activation times tr12, tr22, shown in FIG. 8. However, the activation time tr12 for the first vehicle V1 in the second set of activation times tr12, tr22, shown in FIG. 8, is changed, more specifically delayed, by a time interval Δt, compared to the activation time tr11 for the first vehicle V1 in the first set of activation times tr11, tr21, shown in FIG. 7.

When the simulation S3 of the vehicle movements has been repeated S4 the predetermined number x of times, from the sets of activation times created by the repetition, a set of activation times tr12, tr22 is selected S5, in this example, the activation time set shown in FIG. 8. The activation time set is selected for controlling the vehicles V1, V2. The selected activation time set is the activation time set for which the simulation S3 shows that there is no time overlap of vehicles at any of the single vehicle areas SLTA1, SLTA2, SP, TP. The activation time set of FIG. 8 is therefore selected S5 for controlling the vehicles. The method further comprises controlling S6 the vehicles according to the speed profiles and the selected set of activation times.

More generally, the selected activation time set is the activation time set for which the simulation S3 shows that there is a minimum time overlap, preferably negative, of vehicles at any of the single vehicle areas SLTA1, SLTA2, SP, TP.

Preferably, the staying durations, or waiting durations, are minimized. For example, when the simulations S3 for two or more activation time sets all show that there is no time overlap of vehicles at any of the single vehicle areas, the activation time set selected may be the one showing the smallest staying durations. For example, the activation time set selected may be the one showing the smallest sum of staying durations.

It is to be understood that the present invention is not limited to the embodiments described above and illustrated in the drawings; rather, the skilled person will recognize that many changes and modifications may be made within the scope of the appended claims.

The invention claimed is:

1. A method for controlling a plurality of vehicles which are repeating a cycle of driving along a same route, which has at least one single vehicle area, comprising:
determining speed profiles for each of the plurality of vehicles,
creating a set of different activation times for each of the plurality of vehicles to begin travel along the same route, from an activation position of the cycle,
simulating vehicle movements through the cycle, with the speed profiles and the created set of activation times, repeating, a plurality of repetition times, the step of creating a set of activation times, resulting in a plurality of different sets of different activation times, repeating, for each of the plurality of repetition times, the step of simulating vehicle movements, resulting in a plurality of simulations, selecting, for controlling the vehicles, from the plurality of different sets of different activation times, a particular set of different activation times for the plurality of vehicles for which a corresponding particular simulation shows that there is a minimum time that vehicles travelling in opposite directions along the same route are present at any of the at least one single vehicle areas at a same time, and controlling the vehicles to drive along the same route according to the speed profiles and the selected set of different activation times.

2. The method according to claim 1, characterized in that at least a portion of the route is on a road, on which the vehicles move in both directions, and which has at least one portion with a single lane, wherein at least one of the at least one single vehicle area is formed by the at least one single lane road portion.

3. The method according to claim 1, characterized in that the determined speed profiles are the same for the vehicles.

4. The method according to claim 1, characterized in that the step of simulating vehicle movements comprises simulating vehicle movements over at least two cycles.

5. The method according to claim 1, characterized in that selecting, for controlling the vehicles, a set of different activation times comprises determining, from each simulation, a largest time two vehicles travelling in opposite directions are at the same single vehicle area, resulting in a plurality of largest time overlaps.

6. The method according to claim 5, characterized by selecting, for controlling the vehicles, a particular set of different activation times of a corresponding particular simulation presenting a lowest time overlap from the plurality of largest time overlaps.

7. The method according to claim 1, characterized in that selecting, for controlling the vehicles, a set of different activation times comprises selecting a particular set of different activation times for which a corresponding particular simulation shows that there is no time vehicles travelling in opposite directions along the same route are present at any of the at least one single vehicles area.

8. The method according to claim 1, characterized in that selecting, for controlling the vehicles, a set of different activation times also comprises, for each simulation in the plurality of simulations, determining a shortest time gap between movements of two vehicles through any one of the at least one single vehicle area, resulting in a plurality of shortest time gaps.

9. The method according to claim 8, characterized by selecting, for controlling the vehicles, a particular set of different activation times of a corresponding particular simulation presenting a largest time gap from the plurality of shortest time gaps between movements of two vehicles through any one of the at least one single vehicle area.

10. The method according to claim 1, characterized in that the sets of different activation times for each of the plurality of vehicles are created randomly.

11. The method according to claim 1, characterized in that repeating the step of creating a set of different activation times comprises changing one or more activation times by one or more predetermined time intervals.

12. The method according to claim 11, characterized by determining a plurality of possible combinations of different activation times, in which one of more of the different activation times differ from one set to another by the one or more predetermined time intervals.

13. The method according to claim 1, characterized in that the route extends between two end positions, the activation position being one of the end positions.

14. The method according to claim 1, characterized by determining a plurality of estimated times of arrival of the vehicles, at the activation position.

15. The method according to claim 14, characterized in that the plurality of different sets of different activation times are created in dependence on the plurality of estimated times of arrival.

16. The method according to claim 14, characterized in that the plurality of estimated times of arrival of the vehicles are determined at least partly based on the speed profiles.

17. The method according to claim 14, characterized by determining a plurality of actual positions of the vehicles, wherein the plurality of estimated times of arrival of the vehicles are determined at least partly based on the plurality of actual positions.

18. The method according to claim 1, characterized in that the plurality of different sets of different activation times are created by creating sets of staying durations at the activation position.

19. The method according to claim 18, characterized in that the selected set of different activation times minimizes the staying durations.

20. The method according to claim 13, characterized in that the end positions are a loading position, and an unloading position, respectively.

21. The method according to claim 18, characterized in that the staying durations include respective durations for loading, or unloading the vehicles, upon arriving at the one of the one of the end positions, and respective waiting durations of the vehicles.

22. The method according to claim 21, characterized in that the staying durations are not shorter that the respective loading or unloading durations.

23. The method according to claim 1, characterized in that the set of different activation times comprises a set of starting times and in that the activation position is a starting position.

24. A non-transitory computer readable medium carrying a computer program comprising program code for performing the steps of claim 1 when said program code is run on a computer, or a group of computers.

25. A control unit, or a group of control units, configured to perform the steps of the method according to claim 1.

* * * * *